United States Patent [19]

Rando

[11] Patent Number: 5,784,793
[45] Date of Patent: Jul. 28, 1998

[54] MARKING TEMPLATE FOR CONSTRUCTION LASERS

[75] Inventor: Joseph F. Rando, Los Altos Hills, Calif.

[73] Assignee: LeveLite Technology Inc., Mountain View, Calif.

[21] Appl. No.: 631,572

[22] Filed: Apr. 12, 1996

[51] Int. Cl.⁶ .................................................. G01C 15/02
[52] U.S. Cl. ........................ 33/282; 33/227; 33/DIG. 21
[58] Field of Search ............................ 33/DIG. 21, 666, 33/227, 282, 283, 285

[56] References Cited

U.S. PATENT DOCUMENTS

| | | | |
|---|---|---|---|
| 3,324,557 | 6/1967 | Hodges | 33/227 |
| 3,909,952 | 10/1975 | Lagasse | 33/283 |
| 3,988,837 | 11/1976 | Benson | 33/227 |
| 4,183,667 | 1/1980 | Denton. | |
| 4,206,550 | 6/1980 | Boyett et al. | 33/227 |
| 4,448,528 | 5/1984 | McManus. | |
| 5,075,977 | 12/1991 | Rando. | |
| 5,144,487 | 9/1992 | Hersey. | |
| 5,159,760 | 11/1992 | Spiegel et al.. | |
| 5,491,555 | 2/1996 | Romine | 33/DIG. 21 |
| 5,509,209 | 4/1996 | Swierski | 33/282 |
| 5,572,797 | 11/1996 | Chase | 33/DIG. 21 |

*Primary Examiner*—Thomas B. Will
*Attorney, Agent, or Firm*—Thomas M. Freiburger

[57] ABSTRACT

A construction laser tool which projects a plumb beam is provided with a marking template, movable and separate from the tool's housing but securable to the housing, for transferring a point on a floor to the laser beam or, in another case, for transferring the beam to locate a point on the floor. The template has a marker such as a hole to receive a pencil, and the marker is positioned under the laser tool housing, on the vertical line of the plumb beam where the floor point of interest cannot be seen, when the plumb beam is projected at a point on the ceiling. To accurately mark the floor point, the user holds the template in place on the floor and moves the laser tool away to gain access to mark the point. The reverse procedure is used to align the plumb beam over a known point on the floor. Several arrangements involving sliding templates are disclosed.

6 Claims, 2 Drawing Sheets

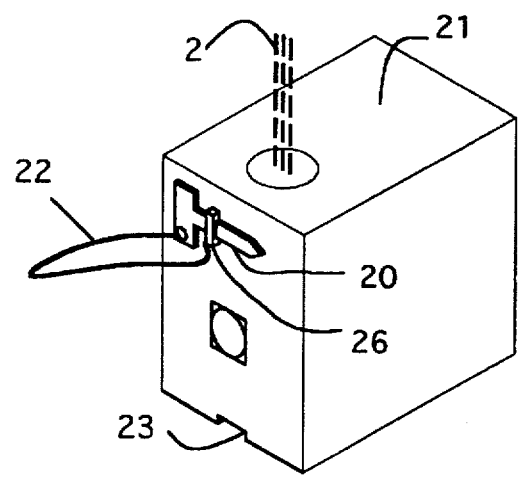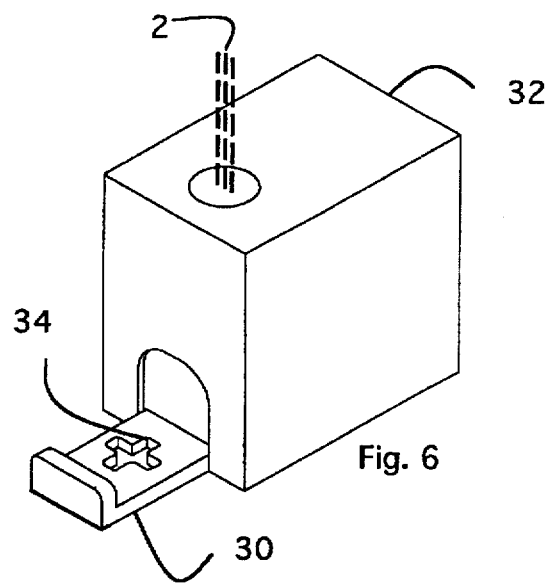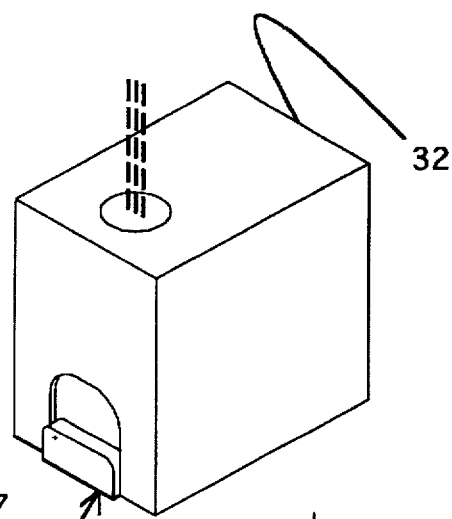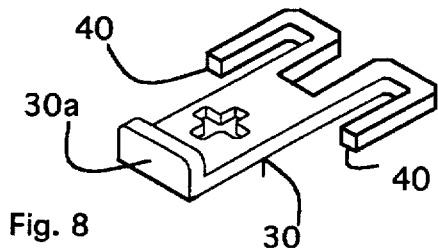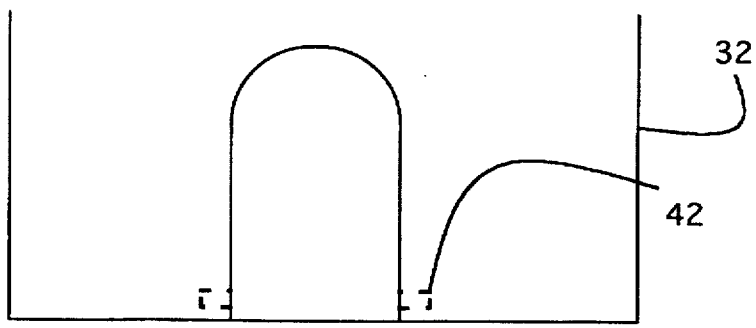

MARKING TEMPLATE FOR CONSTRUCTION LASERS

BACKGROUND OF THE INVENTION

This invention relates to laser tools used in the construction industry, including self-leveling laser pointing tools such as shown in U.S. Pat. Nos. 5,075,977 and 5,459,932. The disclosure of the latter patent is incorporated herein by reference.

In construction situations it is often necessary to transfer a point from one elevation to another. In particular, it is often necessary to project a beam of light from a point on the floor to locate a point on the ceiling. Conversely, it is sometimes necessary to project a point on the ceiling to the floor. In the latter case, a plumb bob may be used although this requires fastening to the ceiling, suspending a string, adjusting its length, and transferring a point. Laser instruments have been designed to project a plumb beam of light for the purposes of transferring reference points from the floor to the ceiling and vise versa, and such instruments include the two above-listed patents.

In Denton U.S. Pat. No. 4,183,667, a point on a floor can be transferred to a ceiling using an upwardly directed and a downwardly-directed light beam. The same concept is used in Mc Manus U.S. Pat. No. 4,448,528; Hersey U.S. Pat. No. , 5,144,487, and is shown conceptually in FIG. 1 herein. In FIG. 1 a laser beam 2 is projected in the plumb direction from a housing 4. A downwardly-directed beam 6 is aligned with the plumb beam and makes a spot 8 on the floor. The construction worker can use a pencil to mark one or both points depending on the application. This method is expensive to implement in the portable tool because of the cost of the additional optics and space required to allow the user to see and mark the spot. An alternative method of marking is described in Rando U.S. Pat. No. 4,852,265, Rando U.S. Pat. No. 5,075,977, and others as shown in FIG. 2. In this arrangement a pencil or other marking instrument is used to mark the notches on the case of the instrument. Referring to FIG. 2, a housing 10 has reference notches 12 to indicate the center of the plumb beam projected to the floor. Three or four symmetric notches may be used. This method, however, still requires the user to align the notches by sight, or to draw a cross on the floor to be sure the tool is properly positioned.

SUMMARY OF THE INVENTION

The invention is a method and device for quickly and accurately locating a point under a portable laser housing on a floor in an inexpensive manner without increasing the size of the tool's housing. A marking template which may be captive to the laser housing is used to transfer a point on the housing to the floor, where the laser housing blocks that point from direct view of the user. The template makes contact with the floor and maintains its relation to the floor while the housing is slid away from the template revealing the marking detail; or, if a point existing on the floor is to be transferred to the laser beam, the template, displaced from the laser housing, is placed on the point and the laser housing is slid onto the template.

Thus, two general cases are presented. In a first case in which the mark is already on the floor and a loose template is used, the template is placed on the floor with a reference hole of the template directly over the mark. While the user holds the template down with one finger, the laser projector is slid over the template until the template is nesting fully in the groove provided. Since the reference hole placement has been chosen to correspond to the point where the plumb beam would intersect the slidable template device, the plumb beam of light is accurately projecting the mark on the floor vertically to the ceiling or other surface. In the other case, a point on the ceiling is to be transferred to the floor. Once the projected beam has been positioned on the ceiling point, the point may be transferred by inserting (or leaving) the template fully in the groove without moving the laser projector. Then, holding the template in place, the user slides the laser projector away from the template, revealing the template reference hole and allowing it to be marked with a pencil.

In a preferred embodiment of the invention, the template may be tethered to the laser projector using a string or cord. In another preferred embodiment the template is on a captured slide which has an in and out position, like a drawer. In all embodiments the template member has a position of tactile registry with the housing, which can be felt by the user when the template or the housing is moved to that position. Various forms of tactile registry could be used, not necessarily involving sliding movement to reach that position.

It is accordingly among the objects of the invention to make more convenient, efficient and accurate the transferring of a point from a laser projector tool to a floor, or from a known floor point to the laser projector, particularly the plumb beam of the laser device. These and other objects, advantages and features of the invention will be apparent from the following description of preferred embodiments, considered along with the accompanying drawings.

DESCRIPTION OF THE DRAWINGS

FIG. 5 is a schematic perspective view of the laser projector of FIGS. 3 and 4 with the marking template stowed.

FIG. 6 is a schematic perspective view showing another embodiment of a laser projector with a marking device according to the invention, the housing in this case containing a marking template on a drawer-like slide.

FIG. 7 is a schematic perspective view of the device of FIG. 6, with the drawer-like marking template slid fully back in the housing to transfer a point.

FIG. 8 is a schematic perspective view showing the sliding template from the assembly of FIGS. 6 and 7.

FIG. 9 is a schematic partial elevation view of the device of FIGS. 6 and 7, indication a groove which receives the template of FIG. 8.

DESCRIPTION OF PREFERRED EMBODIMENTS

Figure 1:
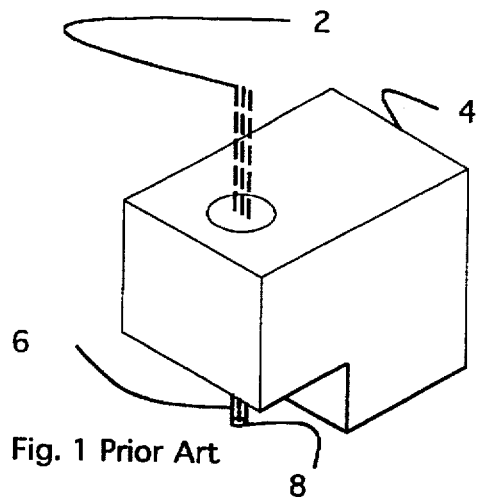
FIG. 1 is a schematic perspective view of a laser projector tool which includes a downwardly-directed reference laser beam for point location, in accordance with prior art.
Figure 2:
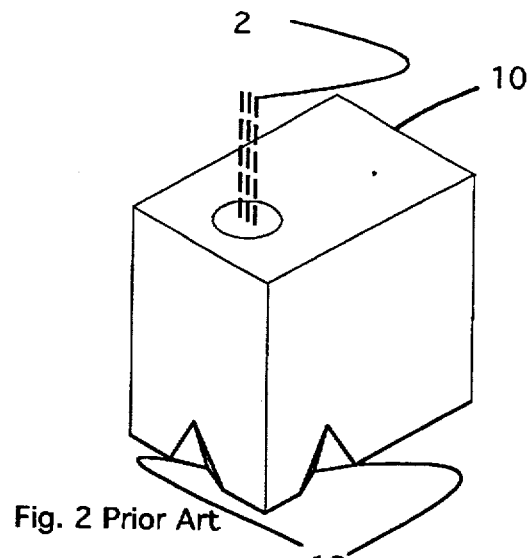
FIG. 2 is a schematic perspective view of a laser projector tool with reference marking notches, also in accordance with prior art.
Figure 3:
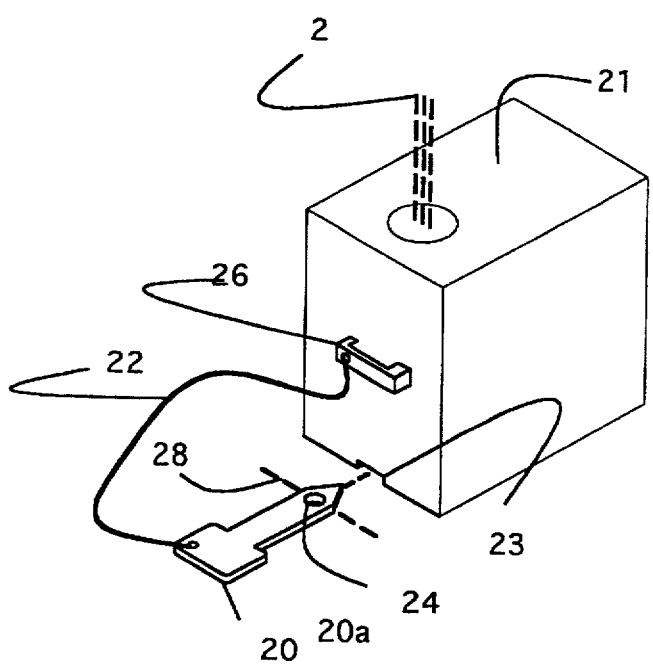
FIG. 3 is a schematic perspective view of a laser projector of the invention, with a captive marking template, dislodged from the laser projector housing and placed over a mark.

Referring now to the drawings, wherein like components are given like reference numerals, FIG. 3 shows a preferred embodiment of the invention in which a marking template member 20 is fastened to a housing 21 with a string or cord 22. The housing has a groove 23 in the bottom which allows the template to slide snugly under the housing without moving the housing. The groove 23 runs directly under the plumb light beam. A reference hole 24 lies directly below the plumb beam when the template is inserted fully into the groove. In other words, an extension of the plumb beam would go directly through the reference hole. When the template 20 is not in use it may be stored in a holder 26 provided in or on the housing, and this may be a U-shaped bracket as shown, or other appropriate holding device.

Figure 4:
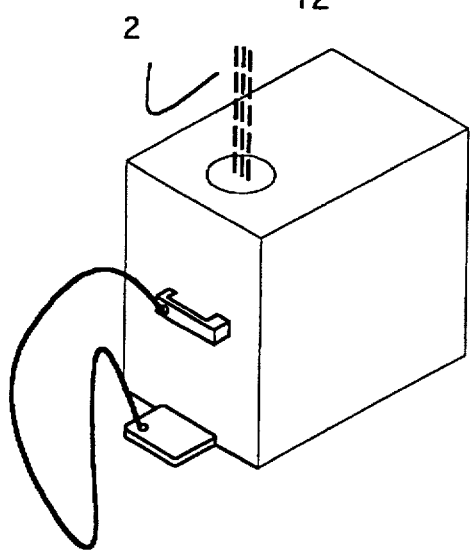
FIG. 4 is a schematic perspective view of the laser projector of FIG. 3, with the laser projector having been slid over the marking template.

In FIG. 3, a mark 28 (a cross on the floor) is to be transferred to the ceiling. First the template 20 is positioned over the floor mark 28 as shown in the figure. The template is then pressed to the floor with one finger or thumb, at an end area 20a, or otherwise temporarily held to the floor while the housing is slid over the template without moving the template. References to holding this member to the floor or other horizontal surface, herein and in the claims, are intended to include holding by means other than manually. The plumb beam is now directly over the mark 28 on the floor (a very slight and negligible error is introduced if the laser tool is, as preferred, a self-leveling tool as in U.S. Pat. No. 5,459,932 and is off-level near the limit of its self-leveling range). A mark on the ceiling can now be made using the projected spot from the plumb laser beam 2. FIG. 4 shows the template in its fully inserted position. As described above, the process may be reversed if a mark on the ceiling is to be transferred to the floor. FIG. 5 shows the marking template in the stored position.

An alternate embodiment of the invention is shown in FIG. 6 in which a marking template 30 is a sliding member which is held captive in a housing 32 rather than simply fitting into a groove as in FIGS. 3–5. A cross-shaped hole 34 facilitates marking the floor with a pencil or positioning the hole center over a mark on the floor (this could be a simple round hole as in FIG. 3). The sliding template is contained in the housing by grooves in the lower side of the housing slightly above the bottom of the housing. The template is designed so that it makes frictional contact with the floor when the operator presses down on it, which may be by a slight bending of the template when the outer end 30a is pushed down to the floor with the finger or thumb. A detail of one preferred slide construction is shown in FIG. 8. Two arms 40 of the template 30 are captured in grooves 42 (FIG. 9) in the housing, just above the bottom of the housing. This allows the slide to be easily moved in and out by the operator. The template is made of a material such as hard rubber or plastic, which allows it to bend when pressed by the operator. As can be seen from FIG. 8 the template arms can be squeezed inward for assembly into the grooves 42.

The invention thus encompasses a plumb beam projecting laser tool having a separate or relatively movable template member with some form of reference marking means suitable for visually locating a point on a floor without being blocked by the tool itself; and having some form of registry means with the housing whereby the template may be moved relative to the tool or vice versa to a position of tactile registry with the tool housing, i.e. a position which the user can easily determine by feel. The sliding embodiments above are convenient and efficient, but other arrangements can be used. For example, the housing bottom can have dimples which, when the housing is over the template, register with nipples on the upper surface of the template.

Many modifications to the preferred embodiment will be apparent to those of ordinary skill in the art but such modifications will still embody the invention. Therefore, the invention is not intended to be limited by the scope of the detailed description of the drawings, but by the claims which follow.

I claim:

1. A plumb beam laser projector tool, comprising:

a housing, means in the housing for projecting a plumb, upwardly directed laser beam, a template member which is movable relative to the housing, having reference marking means suitable for visually locating a mark or point on a floor under the template member, registry means cooperative between the template member and the housing for enabling positioning of the template member substantially at the bottom of the housing in a position of tactile registry with the housing wherein the reference marking means is positioned on a line on which the plumb beam lies, the registry means comprising a groove in the bottom of the housing, with the template member being sized to slide in the groove, from an outward position wherein the mark or point can be visually located with the marking means, to a fully inward position wherein the marking means is on said line, said fully inward position being said position of tactile registry and being capable of being determined by touch by a user.

2. The apparatus of claim 1, wherein the housing includes means for storing the template.

3. The apparatus of claim 1, further including a string or cord securing the template to the housing.

4. A plumb beam laser projector tool, comprising:

a housing, means in the housing for projecting a plumb, upwardly directed laser beam, a template member which is movable relative to the housing, having reference marking means suitable for visually locating a mark or point on a floor under the template member, registry means cooperative between the template member and the housing for enabling positioning of the template member substantially at the bottom of the housing in a position of tactile registry with the housing wherein the reference marking means is positioned on a line on which the plumb beam lies, and the housing including means for storing the template member in a captive position different from said position of tactile registry.

5. A plumb beam laser projector tool, comprising:

a housing, means in the housing for projecting a plumb, upwardly directed laser beam, a template member which is movable relative to the housing, having reference marking means suitable for visually locating a mark or point on a floor under the template member, registry means cooperative between the template member and the housing for enabling positioning of the template member substantially at the bottom of the housing in a position of tactile registry with the housing wherein the reference marking means is positioned on a line on which the plumb beam lies, and the template member including means for manually holding the template member down to a floor while the housing is moved away from the template member or into a position of registry on the template member, said means for holding comprising a thin, flat extension of the template member positioned to extend out from only one side of the housing when the template member is in said position of tactile registry, the extension thus lying flatly against the floor so that a finger or thumb of the user can be pressed against the extension to hold the template member in place on the floor.

6. A plumb beam laser projector tool, comprising:

a housing, means in the housing for projecting a plumb, upwardly directed laser beam, a template member which is movable relative to the housing, having reference marking means suitable for visually locating a mark or point on a floor under the template member, registry means cooperative between the template member and the housing for enabling positioning of the template member substantially at the bottom of the housing in a position of tactile registry with the housing wherein the reference marking means is positioned on a line on which the plumb beam lies, and the movable template member comprising a slide piece captive on the housing, with slide means acting between the housing and the slide piece providing for movement of the slide piece as a drawer from the housing, from an outwardly extended position to an inward position comprising said position of tactile registry.

\* \* \* \* \*